United States Patent [19]

Ben-Nasr et al.

[11] Patent Number: 5,089,280
[45] Date of Patent: Feb. 18, 1992

[54] PROCESS FOR DECAFFINATING GREEN COFFEE BEANS

[75] Inventors: Hedi Ben-Nasr; Friedrich W. H. Coenen, both of Essen, Fed. Rep. of Germany

[73] Assignee: Kohlensäure-Werke Rud. Buse GmbH & Co., Bad Hönningen, Fed. Rep. of Germany

[21] Appl. No.: 63,372

[22] Filed: Jun. 18, 1987

[30] Foreign Application Priority Data

Jun. 20, 1986 [DE] Fed. Rep. of Germany ........ 3620622
Apr. 25, 1987 [DE] Fed. Rep. of Germany ........ 3713953

[51] Int. Cl.$^5$ ................................................ A23F 5/20
[52] U.S. Cl. ...................... 426/427; 426/428; 426/447; 426/595
[58] Field of Search .............. 426/447, 427, 428, 595

[56] References Cited

U.S. PATENT DOCUMENTS

| | | | |
|---|---|---|---|
| 2,278,473 | 4/1942 | Musher | 426/595 X |
| 2,309,092 | 1/1943 | Berry et al. | 426/424 |
| 3,879,569 | 4/1975 | Vitzhum et al. | 426/427 |
| 4,002,772 | 1/1977 | Haas | 426/425 X |
| 4,263,253 | 4/1981 | Pilz et al. | 422/1 |
| 4,531,529 | 7/1985 | White et al. | 131/901 X |
| 4,554,932 | 11/1985 | Conrad et al. | 131/901 X |
| 4,659,577 | 4/1987 | Meinhold et al. | 426/424 X |
| 4,700,726 | 10/1987 | Townsend et al. | 131/364 |

*Primary Examiner*—Joseph Golian
*Attorney, Agent, or Firm*—Spencer & Frank

[57] ABSTRACT

A simple, reliable process for decaffeinating green coffee beans to a high degree while avoiding denaturation of the green coffee beans includes wetting the green coffee beans to a high water content of 35-50%-wt.; compressing the beans in a pressure chamber for a period of a few minutes to several hours in an atmosphere comprised of a supercritical fluid which is a gas at STP, at a temperature ranging from 20° to 80° C. under a critical pressure ranging from 75 to 300 bar; decompressing the wetted beans from critical pressure $p_c$ to a pressure p for which $p_c \leq p \leq 1$ bar abruptly or in the space of a few minutes, while avoiding freezing the green coffee beans; washing with water or with the supercritical fluid for selective extraction of the caffeine; repeating the process one or more times; centrifuging; drying; and roasting the beans. Further, caffeine is recovered in a known manner from the washing medium.

15 Claims, 2 Drawing Sheets

PROCESS FOR DECAFFINATING GREEN COFFEE BEANS

BACKGROUND OF THE INVENTION

1. Field of the Invention

The invention relates to a process for decaffeinating green coffee beans in which caffeine is removed from the green coffee beans by means of a supercritical fluid which is gaseous under standard conditions of temperature and pressure, i.e., 1 bar, 20° C.

2. Background of the Art

Many individuals cannot tolerate whole coffee because of its caffeine content. Numerous processes have therefore been developed to extract caffeine from the coffee while avoiding removal of other substances which are needed to create aroma during roasting of the beans and/or brewing of the beverage. When caffeine is removed from green coffee beans, loss of aroma cannot be avoided.

In one traditional decaffeinating process, green coffee beans are subjected to a pretreatment step, e.g., decomposition of the coffee beans by steam at high temperature; then leached by solvents such as di- or trichloroethylene to remove caffeine; treated to remove solvent from the leached green coffee beans through evaporation; and dried to remove moisture. This known process, however, does not preclude solvent residues remaining in the coffee and occurance of a certain denaturation of the green coffee beans.

Processes have also been suggested using extraction solvents which are supercritical fluids, that is, substances at a high temperature and pressure which are neither in the liquid state nor the gaseous state, but are in a state of matter in which they exhibit the properties of both liquids and gases. In such processes, long extraction times are typically required to achieve sufficient decaffeination. This is due to the fact that the caffeine must first diffuse to the surface of the coffee beans so that it can be absorbed by the solvent. This process slows down further as caffeine concentration in the coffee beans is reduced. In many of these known processes, the solvent is cycled during extraction requiring high capital equipment investment and high energy costs.

SUMMARY OF THE INVENTION

It is an object of the present invention is to provide a simple, reliable process for decaffeinating and roasting green coffee beans that will ensure a high degree of decaffeination and prevent any denaturation of the other green coffee bean constituents.

It is a further object of the invention to provide coffee beans decaffeinated and roasted in accordance with the inventive process.

The primary object of the invention is accomplished in a surprising manner when, according to a first embodiment of the invention, moist green coffee beans having bean cells containing an aqueous caffeine solution are positioned in a pressure chamber, such as an extraction autoclave, and are compressed for a period of a few minutes to several hours by subjecting the moist beans to an atmosphere comprised of a supercritical fluid which is a gas under standard conditions of temperature and pressure (STP), under a pressure ranging from 75 to 300 bar at a temperature ranging from 20° to 80° C., followed by being decompressed abruptly or in the space of a few minutes to a pressure p for which critical pressure $p_c \leq p \leq 1$ bar, after which the decompressed coffee beans are washed with water to dissolve/entrain caffeine. This process cycle of compressing, decompressing and washing the green coffee beans may be repeated several times if needed to achieve a desired degree of decaffeination. The beans are then treated in a centrifuge for separation and removal of any residual aqueous caffeine solution, caffeine being recovered from the residual aqueous caffeine solution and from the wash water.

Instead of a process cycle including washing the decompressed green coffee beans with water, caffeine can also be extracted selectively in an advantageous manner by the supercritical fluid itself. For this variation of the process cycle, after compression and decompression, gas pressure in the pressure chamber is raised again to the pressure range of from 75 to 300 bar at a temperature ranging from 20° C. to 80° C. to provide a supercritical fluid phase containing the supercritical fluid and at least a portion of the aqueous caffeine solution, and the supercritical fluid is recirculated. Recirculation is achieved by causing the supercritical fluid phase charged with caffeine to flow from the pressure chamber, such as an extraction autoclave, through a water washing means, such as a water tower, to be washed free of dissolved/entrained caffeine. Thus regenerated, the caffeine-free supercritical fluid phase is returned to the pressure chamber.

The surprisingly efficient caffeine extraction achievable by the various embodiments of this pressure change process is believed to be attributable to a series of effects that complement each other in an advantageous manner. First, extraction of caffeine is simplified by forming within the beans an aqueous caffeine solution by moistening the green coffee beans so that water is absorbed by the cells of the beans. Extraction of other substances, especially those required to create aroma during roasting, is thus reduced to a minimum.

Second, rapid decompression of the gas causes further loosening without breakdown of the cellular structure of the swelled beans, which augments water absorption and caffeine dissolution. In addition, a marked increase in volume of gas diffused into the green coffee bean cells is achieved which forces the aqueous caffeine solution to the surface of the beans. Finally, gas trapped in the interstices of the coffee beans, which escapes during decompression, prevents the caffeine concentrated at or near the surface of the coffee beans from diffusing back into the beans.

Third, rapid washing of the coffee beans removes primarily those substances present on their surface, most particularly caffeine in aqueous solution. Subsequent centrifuging separates out the remaining aqueous caffeine solution along the periphery of the coffee beans that was not removed by the washing process. Residual caffeine content is thus greatly reduced and, in addition, the beans are pre-dried.

The process of the invention can be carried out in an especially advantageous manner by wetting the green coffee beans to be leached with water to provide wetted beans having a water content ranging from 35 to 50 percent by weight, preferably 40 percent by weight; compressing under a pressure ranging from 100 to 200 bar and at a temperature ranging from 20° to 80° C.; washing the coffee beans during or immediately after decompression with warm (60°-65° C.) water, preferably with stirring during washing; centrifuging the leached and washed green coffee beans, and removing caffeine from the washing water and from the aqueous phase from the centrifuge, so that caffeine-free water, charged with green coffee bean constituents, may be recirculated for washing other green coffee beans. Even water which is saturated with green coffee bean constituents other than caffeine may be used.

Instead of washing the decompressed green coffee beans with water, the caffeine can also be extracted in an especially advantageous manner by the supercritical fluid itself, if, after compression and decompression, the pressure in the pressure chamber is raised again to a ranging of from 100 to 200 bar at a temperature ranging from 31 to 80° C., the supercritical fluid is recirculated and, if, the caffeine-charged supercritical fluid phase is washed by being directed through a water washing means, such as a water tower maintained at the same temperature and pressure conditions as those of the pressure chamber, is regenerated, and fed again to the pressure chamber.

Carbon dioxide or a mixture of water and carbon dioxide are particularly suitable to build up the gaseous atmosphere in the pressure chamber. However, in accordance with the present invention, any gas may be used to build up the stationary gaseous pressure whose thermodynamic properties are such that it will diffuse in appreciable concentration into the moist green coffee bean cells filled with aqueous caffeine solution. A mixture of water and such a gas can also be used advantageously. A caffeine-free aqueous solution which is saturated with green coffee bean constituents other than caffeine, as may be used to wash the decompressed beans, can also be used instead of pure water.

The beans will be subjected to gas pressure for a period of a few minutes to several hours, such as a period ranging from two minutes to five hours, depending on the type of coffee to be extracted and the desired degree of decaffeination. The decompression of the gaseous atmosphere can take place abruptly or in the space of a few minutes, such as over a period ranging from 0.0001 seconds to ten minutes, the moist green coffee beans having to be protected from freezing caused by expansion cooling over a longer time interval. When extracting caffeine with the supercritical fluid itself, the fluid is recirculated for a period ranging from a few minutes to several hours, such as a period ranging from two minutes to five hours.

Effective and uniform washing of the coffee beans is achieved if the washing water charged with green coffee constituents other than caffeine is preheated to 60°–65° C. and if the coffee beans are stirred during the washing. No appreciable loss of aroma from the coffee beans results from such treatment.

It has also been established that the residual caffeine content is reduced by a factor of two to four if the leached and washed coffee beans are centrifuged immediately, which is therefore preferred. Advantageously, the coffee beans are pre-dried by the centrifuging step, so that energy is saved in subsequent drying and roasting of the beans.

BRIEF DESCRIPTION OF THE DRAWING

The invention may be better understood by referring to the detailed description of the invention when taken in conjunction with the accompanying drawing in which.

DETAILED DESCRIPTION OF THE PREFERRED EMBODIMENTS

Figure 1:
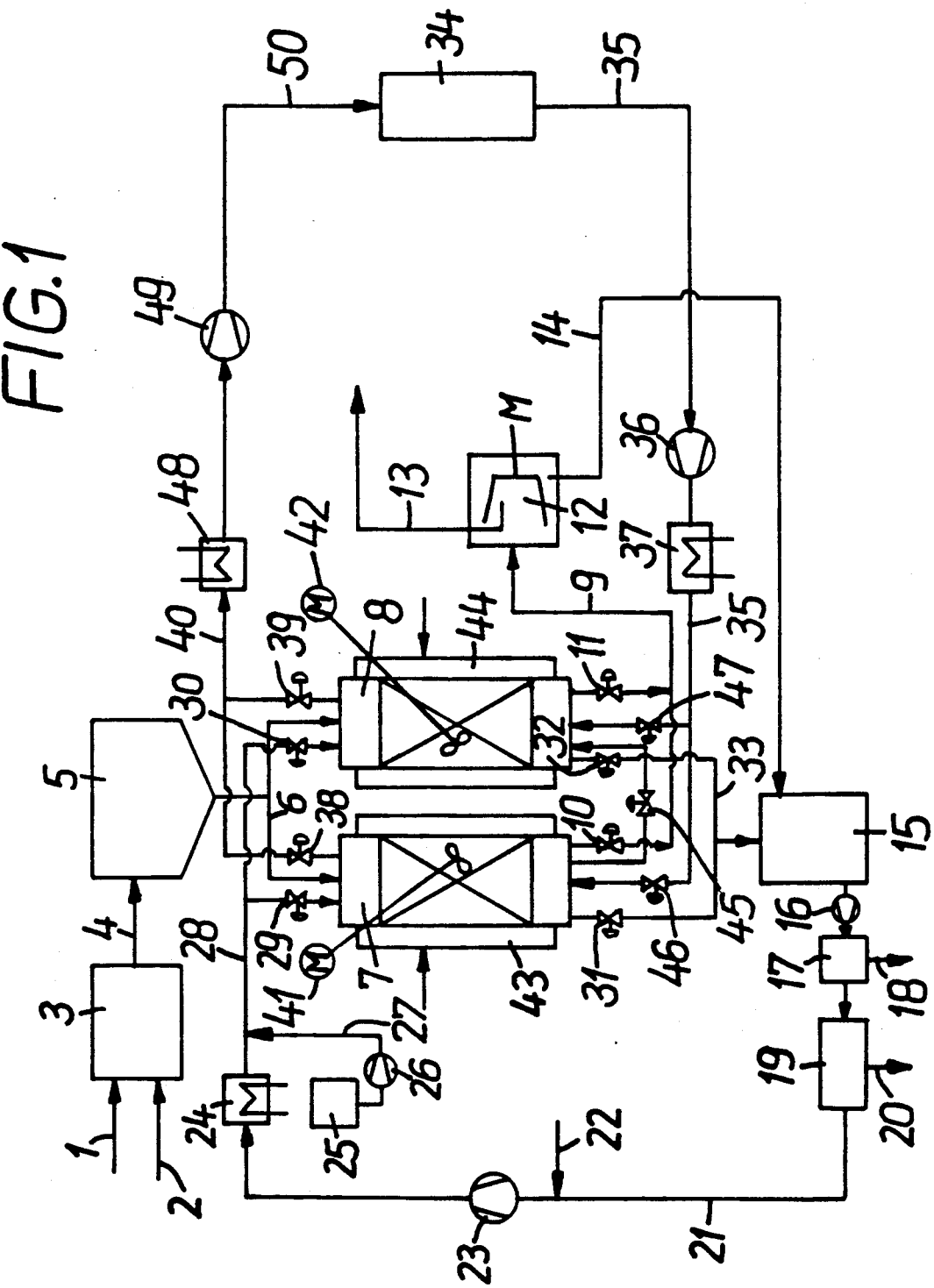
FIG. 1 is a schematic representation of apparatus useful in performing a first embodiment of the green coffee bean decaffeination process according to the invention.

FIG. 1 is a schematic representation of an apparatus arrangement for performing one version of the present process for production of decaffeinated green coffee beans. In this first embodiment of the process, green coffee beans having a natural moisture content of from 8%–11%-wt. are introduced via line 1 and wetted by introducing water through water line 2 in tank 3 to a desired water content ranging from 35 to 50% wt., preferably 40%-wt., and are fed to storage tank 5. The moist green coffee beans enter through line 6 into either of pressure tanks 7 and 8, which are provided with heating jackets 43 and 44 for temperature control and with stirring devices 41 and 42. The gas pressure in one pressure tank 7 or 8 is built up by pump 36. The gas to be employed is removed from storage tank 34 through line 35, raised by pump 36 to extraction pressure of the gas atmosphere used, warmed in heat exchanger 37 to extraction temperature, and conveyed through valve 46 or 47 to pressure tank 7 or 8. A mixture of water and a supercritical fluid is employed, and the water may be caffeine-free process water, possibly charged with green coffee bean constituents, stored in collecting tank 15. The mixture is conveyed by pump 23 via heat exchanger 24 and valve 29 or 30 into pressure tank 7 or 8, until a stationary pressure condition is reached. After a dwell time, which depends on the degree of decaffeination desired and the type of coffee bean being treated, pressure tank 7, which is under pressure, is partially decompressed to a pressure p ($p_c \leq p \leq 1$ bar) into depressurized tank 8 via valve 45, or vice versa. Further decompression from p to 1 bar takes place via valve 38 or 39, line 40, heat exchanger 48 and pump 49 into gas storage tank 34. The task of heat exchanger 48 is to liquefy the gas pre-cooled by expansion cooling.

To wash the coffee beans, washing water, decaffeinated in installation 19 and possibly charged with other green coffee bean constituents, is conveyed via heat exchanger 24 and valves 29 or 30 into pressure tank 7 or 8 by means of pump 23. Water losses are replaced via line 22. Aromatic substances generally present in green coffee beans can be metered from storage tank 25 by pump 26 through line 27 into the washing water, whereby extraction of substances needed during roasting to create a desirable aroma is reduced to a minimum, particularly if the water is saturated with these aromatic substances. During this washing process, which can be repeated several times, the coffee beans are stirred by stirring device 41, 42.

The washing water is removed from pressure tank 7 or 8 via valve 31 or 32, respectively, and line 33, and conveyed to collecting tank 15. From collecting tank 15, the aqueous caffeine solution is conveyed by pump 16 through filter 17 into decaffeination installation 19 where caffeine is recovered in a conventional manner.

The process of compressing, decompressing and washing can be a cyclic process repeated several times if necessary. Thereafter, the moist green coffee beans are treated in centrifuge 12 and the recovered liquid phase, i.e., the aqueous caffeine solution, is conveyed through line 14 to collecting tank 15. The decaffeinated green coffee beans are removed from the centrifuge through line 13, adjusted to the minimum water content required for subsequent roasting by drying or by adding water and then roasted. The caffeine content of the aqueous caffeine solutions accumulating at two points of the process (tank 7 or 8 and centrifuge 12) is typically highly variable so that separate recovery of caffeine from these mass flows could also prove to be commercially feasible, as well as combined recovery.

Figure 2:
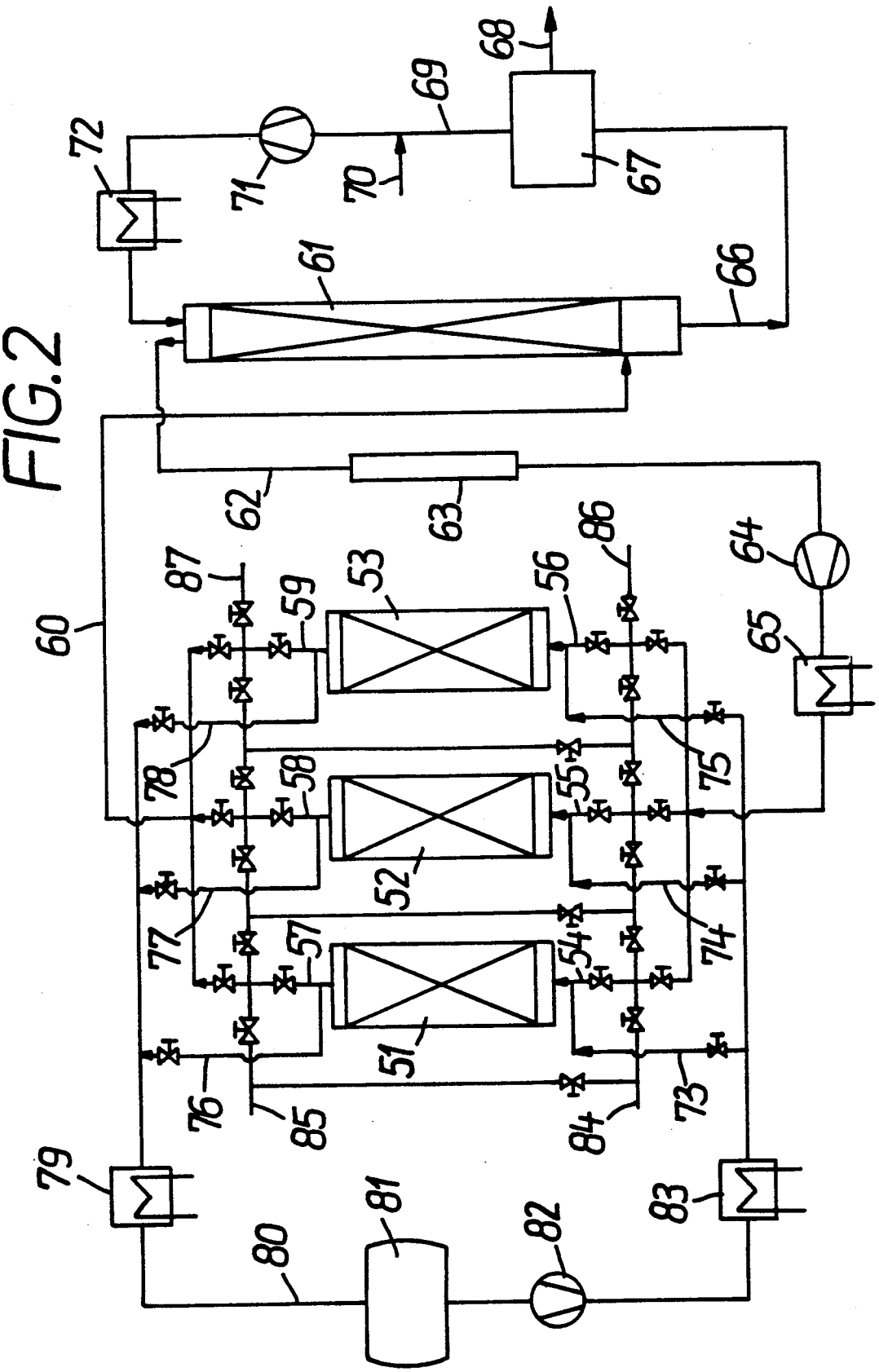
FIG. 2 is a schematic representation of apparatus useful in performing a second embodiment of the green coffee bean decaffeination process according to the invention.

FIG. 2 is a schematic representation of an apparatus arrangement for performing another version of the process for production of decaffeinated green coffee beans. In this second embodiment of the process, green coffee beans having a natural moisture content of from 8–11%-wt. are wetted to a desired water content ranging from 35 to 50%-wt., preferably 40%-wt., and are conveyed selectively into pressure tanks 51, 52 and 53, which are provided with heating jackets for temperature control. The gas pressure in the pressure tanks 51, 52, 53 is built up by pump 82. The gas to be employed is removed from storage tank 81, raised by pump 82 to extraction pressure, brought to extraction temperature in heat exchanger 83, and conveyed selectively via lines 73, 74 and 75 to pressure tanks 51, 52 and 53, respectively. After an extraction time, whose duration depends on the type of coffee to be processed and the desired degree of decaffeination, a pressure tank that is under pressure, e.g., 52, is partially decompressed into a depressurized adjacent tank, e.g., 51. Further decompression to tank pressure is effected via lines 76, 77 and 78, heat exchanger 79, and line 80 into storage tank 81. The task of heat exchanger 79 is to liquefy the gas precooled by expansion cooling.

For selective extraction of the caffeine brought to the surface of the coffee beans by decompression, gas pressure is raised again by pump 82. The gas removed from storage tank 81 is raised by pump 82 to extraction pressure and is brought to extraction temperature in heat exchanger 83. Supercritical fluid is circulated to pressure tanks 51, 52 or 53 by means of pump 64. A supercritical fluid phase charged with caffeine leaves pressure tank 51, 52 or 53 through lines 57, 58 or 59, respectively, and is conveyed via line 60 to washing column 61, where it flows against the water added from above. The supercritical fluid which is almost caffeine-free is discharged from washing column 61 through line 62 and is conveyed to activated carbon filter 63.

It has been determined that complete decaffeination is attained more rapidly if the recirculated supercritical fluid phase is completely regenerated. This may be accomplished by maintaining washing column 61 and activated carbon tank 63 under identically the same conditions of temperature and pressure as whichever of pressure tanks 51, 52 or 53 are pressurized to make a cost-effective isobaric and isothermal operation possible. This measure also prevents any change in the water content of the green coffee beans in tanks 51, 52 or 53 and during the decaffeination process. The regenerated supercritical fluid is returned by pump 64 via heat exchanger 65 and lines 54, 55 and 56 to pressure tanks 51, 52 and 53.

To make the intermittent extraction process approximate a continuous operation, several pressure tanks 51, 52 and 53 are provided at the extraction end as a cascade arrangement, which can be switched into the extraction process in any order so that the supercritical fluid can flow through them in sequence. Only three pressure tanks 51, 52 and 53 are shown in FIG. 2, but it is within the present invention to use more pressure tanks, i.e. extraction tanks or autoclaves, that are connected with pressure tanks 51, 52, 53 by lines 84, 85, 86 and 87. The total number of pressure tanks to be used for optimum implementation of this invention depends mainly on the number of pressure pulsations needed, but also depends on the investment and operating costs required.

The advantage of the cascade arrangement is that one extraction tank can always be emptied after extraction and then be filled with green coffee beans to be decaffeinated while extraction proceeds in the other extraction tanks. Also, series connection of the extraction tanks allows for high caffeine saturation of the recirculated supercritical fluid used in lieu of washing water in this embodiment of the invention. For this purpose, the tank containing beans which have been most fully leached-free of caffeine is supplied first with fresh supercritical fluid. Thereupon, the supercritical fluid, partially charged with caffeine, flows through the other extraction tanks at consecutively higher caffeine concentrations in such a manner that the last extraction tank will contain the green coffee beans with the highest caffeine content which are contacted by the supercritical fluid with the highest cumulative caffeine concentration. In this way, there always remains an optimum caffeine concentration differential between green coffee bean and solvent that is important for an advantageous material balance.

Washing water charged with caffeine leaves washing column 61 through line 66. Caffeine is recovered from this aqueous caffeine solution in a known manner, preferably by evaporation of water, in apparatus 67, and is removed via line 68. The caffeine-free water is removed via line 69, raised by pump 71 to extraction pressure and returned to washing column 61. Water losses are then replaced via line 70.

EXAMPLE 1

In one exemplary embodiment of the inventive process as shown in FIG. 1, 394 g of green coffee beans (unroasted beans) with a caffeine content of 1.04%-wt. were wetted to a water content of 40.9%-wt. The moist green coffee beans were placed in a pressure tank provided with stirring devices. At a temperature of 60° C., carbon dioxide gas was introduced into the pressure tank until a pressure of 60 bar was reached. Then water was pumped into the pressure tank until a pressure of 100 bar was reached and a water-carbon dioxide atmosphere formed. At 60° C. and 100 bar, the water-carbon dioxide atmosphere is a supercritical fluid. The wetted green coffee beans were subjected for four hours to the water-carbon dioxide atmosphere under a pressure of 100 bar at a temperature of 60° C., and were stirred briefly at 15-minute intervals. The pressure tank was then decompressed to standard pressure in the space of a few minutes, such as two to ten minutes. Water was drawn off from the bottom of the pressure tank and the coffee beans were washed with two liters of water (65° C.). The coffee beans were stirred during the washing process and the washing process was repeated three times. A portion of the green coffee beans thus processed was centrifuged for half an hour at 5,000 rpm and 8.2%-wt. of water in relation to the weight of the moist green coffee beans was removed. The caffeine content of the non-centrifuged coffee beans was 0.23%-wt., which corresponds to 77.9% decaffeination. The residual caffeine content of the centrifuged beans was only 0.08%-wt, which corresponds to 92.3% decaffeination.

EXAMPLE 2

In another variation of the exemplary embodiment of the inventive process as shown in FIG. 1, 394 g of green coffee beans (unroasted beans) with a caffeine content of 1.04%-wt were wetted to a water content of 40%-wt. The moist green coffee beans were placed in a pressure tank provided with stirring devices. At a temperature of 60° C., carbon dioxide gas was conveyed to the pressure tank until a pressure of 200 bar was reached and a carbon dioxide atmosphere formed. At 60° C. and 200 bar, the carbon dioxide atmosphere is a supercritical fluid. The wetted green coffee beans were subjected for 45 minutes to the carbon dioxide atmosphere under a gaseous pressure of 200 bar at the temperature of 60° C., and was stirred briefly at five-minute intervals. The pressure tank containing these green coffee beans was then decompressed to standard pressure in the space of a few minutes, such as two to ten minutes. The coffee beans were then washed immediately with two liters of water (57° C.). The coffee beans were stirred during the washing process and the washing process was repeated three times. The process cycle of compressing, decompressing and washing was repeated three times altogether. Then a portion of the green coffee beans thus treated was centrifuged for one half hour at 5,000 rpm and 6.8%-wt. of water in relation to the weight of the moist green coffee beans was removed. The caffeine content of the non-centrifuged coffee beans was 0.26%-wt., which corresponds to 75.0% decaffeination. The residual caffeine content of the centrifuged beans was 0.25%-wt which corresponds to 75.96% decaffeination.

EXAMPLE 3

In a second exemplary embodiment of the inventive process as shown in FIG. 2, 711 g of green coffee beans (unroasted beans) with a caffeine content of 1.26%-wt were wetted to a water content of 44.9%-wt. The moist green coffee beans were placed in a pressure tank. At a temperature of 60° C., carbon dioxide gas was introduced into the pressure tank until a pressure of 250 bar was reached and a carbon dioxide atmosphere formed At 60° C. and 250 bar, the carbon dioxide atmosphere is a supercritical fluid. Supercritical carbon dioxide was then circulated under these temperature and pressure conditions, a carbon dioxide mass flow of 24 kg/h being maintained. Supercritical carbon dioxide charged with caffeine exited the pressure tank through the top thereof and was conveyed for caffeine release, i.e., regeneration of the supercritical carbon dioxide, through three consecutive water purifiers containing altogether 1,950 g of water and maintained at a temperature of 60° C. under a pressure of 250 bar. The regenerated supercritical carbon dioxide was returned to the pressure tank through the bottom thereof.

After a one-hour extraction time, the carbon dioxide atmosphere in the pressure tank was decompressed in the space of five minutes to standard pressure After ten minutes, the pressure was again raised to 250 bar in the space of fifteen minutes, and the caffeine, made more readily accessible by the pressure change, was extracted by the supercritical carbon dioxide. The pressure change was repeated three times in all, extraction times being one, two, two and one hour. The last water purifier of the three consecutive water purifiers was renewed after each pressure change cycle to ensure complete regeneration of the $CO_2$ phase.

Upon completion of the test, the green coffee beans were slowly decompressed to standard pressure in the space of thirty minutes and finally dried to a water content of 10%-wt. With a supercritical solvent ratio of 120 kg of carbon dioxide per kg of green coffee beans (44.9% water content) a residual caffeine content of 0.14%-wt. in relation to dry substance was attained. This corresponds to 88.89% decaffeination. The total weight loss in relation to dry substance was only 1.7%-wt. A white, slightly bitter tasting vapor residue was obtained from the aqueous caffeine solution which had a caffeine content of 85%-wt. of the dry mass.

It will be understood that the above description of the present invention is susceptible to various modifications, changes and adaptations, and the same are intended to be comprehended within the meaning and range of equivalents of the appended claims.

What is claimed is:

1. Process for decaffeinating green coffee beans, comprising:
   a. wetting green coffee beans comprised of caffeine with water to provide wetted beans having a water content ranging from 35 to 50 percent by weight and having bean cells containing an aqueous caffeine solution;
   b. compressing the wetted beans positioned in a pressure chamber by subjecting the wetted beans to an atmosphere comprised of a supercritical fluid which is a gas under standard conditions of temperature and pressure, under a pressure ranging from 75 to 300 bar and a temperature ranging from 20° to 80° C. for a period ranging from a few minutes to several hours;
   c. decompressing the wetted beans in the pressure chamber to a pressure p for which critical pressure $p_c \leq p \leq 1$ bar to provide decompressed beans over a period ranging from abruptly to a few minutes under conditions controlled so that expansion cooling of the atmosphere does not freeze the wetted beans;
   d. washing the decompressed beans with water one or more times to remove the aqueous caffeine solution therefrom as wash water and provide washed beans;
   e. repeating the steps of compressing, decompressing and washing as a process cycle one or more times;
   f. centrifuging the washed beans in a centrifuge to remove residual aqueous caffeine solution therefrom and provide pre-dried beans;
   g. collecting the wash water and the residual aqueous caffeine solution from centrifuging, and recovering the caffeine therefrom in a recovery means;
   h. drying the pre-dried beans to provide dried beans having a water content suitable for subsequent roasting; and
   i. roasting the dried beans.

2. The process according to claim 1, wherein the wetted coffee beans have a water content of 40% by weight.

3. The process according to claim 1, wherein the atmosphere is comprised of a material selected from the group consisting of carbon dioxide, and a mixture of water and carbon dioxide.

4. The process according to claim 1, wherein the gas which comprises the atmosphere has thermodynamic properties such that it will diffuse in appreciable concentration into the bean cells containing the aqueous caffeine solution.

5. The process according to claim 4, wherein the atmosphere comprises a mixture of water and said gas.

6. The process according to claim 1, wherein the pressure ranges from 100 to 200 bar and the temperature ranges from 31° to 80° C.

7. The process according to claim 1, wherein washing the decompressed beans takes place during the decompressing step.

8. The process according to claim 1, wherein the water used in the washing step has a temperature ranging from 60° to 65° C.

9. The process according to claim 1, wherein the decompressed beans are stirred during the washing step.

10. The process according to claim 1, wherein the water used to wash the decompressed beans is charged with one or more water-soluble green coffee bean constituents in order to prevent loss of corresponding water-soluble green coffee bean constituents during the washing of the decompressed beans.

11. The process according to claim 1, wherein water exiting the recovery means during the caffeine recovering step is recirculated for washing the decompressed beans.

12. The process according to claim 11, wherein the water to be recirculated is filtered to separate therefrom any suspended particles that might have been entrained.

13. The process according to claim 1, wherein the pressure chamber is a plurality of pressure chambers which are arranged in a cascade arrangement.

14. The process according to claim 13, wherein the plurality of pressure chambers includes a first pressure chamber and a second pressure chamber and wherein the first pressure chamber is partially decompressed in the decompressing step into the second pressure chamber, which partial decompression is effected by pressure equalization.

15. The process according to claim 1, wherein the atmosphere emerging from the pressure chamber during the decompressing step is recompressed and recirculated to the pressure chamber during a subsequent compressing step of the next process cycle.

* * * * *